(12) United States Patent
Li et al.

(10) Patent No.: US 12,422,567 B2
(45) Date of Patent: Sep. 23, 2025

(54) METHODS AND APPARATUS TO REDUCE COMMUNICATIONS FOR POSITION, NAVIGATION AND TIMING DETERMINATIONS

(71) Applicant: The Boeing Company, Arlington, VA (US)

(72) Inventors: Rongsheng Li, Hacienda Heights, CA (US); Kenneth Cecil Clark, Jupiter, FL (US); Andrey Tolstov, Höhenkirchen-Siegertsbrunn (DE); Tung-Ching Tsao, Torrance, CA (US); Cody L. Gruebele, Corona, CA (US); Chang Jin Yoo, Anaheim, CA (US)

(73) Assignee: The Boeing Company, Arlington, VA (US)

( * ) Notice: Subject to any disclaimer, the term of this patent is extended or adjusted under 35 U.S.C. 154(b) by 310 days.

(21) Appl. No.: 18/182,834

(22) Filed: Mar. 13, 2023

(65) Prior Publication Data
US 2024/0310531 A1    Sep. 19, 2024

(51) Int. Cl.
*G01S 19/45* (2010.01)
*G01S 19/24* (2010.01)

(52) U.S. Cl.
CPC ............ *G01S 19/45* (2013.01); *G01S 19/243* (2013.01)

(58) Field of Classification Search
CPC ...... G01S 19/45; G01S 19/243; G01S 5/0242; G01S 5/0246; G01S 5/10; G01S 19/00; G01S 19/46; G01S 5/021
See application file for complete search history.

(56) References Cited

U.S. PATENT DOCUMENTS

| | | | |
|---|---|---|---|
| 2009/0121940 A1* | 5/2009 | Ladd | G01S 5/10 342/463 |
| 2011/0254734 A1* | 10/2011 | Li | G01S 19/23 342/357.77 |

(Continued)

FOREIGN PATENT DOCUMENTS

| | | |
|---|---|---|
| CN | 114114363 A | 3/2022 |
| EP | 4016110 A1 | 6/2022 |

OTHER PUBLICATIONS

Li, Rongsheng (Ken), "All Source Positioning, Navigation and Timing," Artech House, 2020, citing abstract.

(Continued)

*Primary Examiner* — Kito R Robinson
*Assistant Examiner* — Tanya C Sienko
(74) *Attorney, Agent, or Firm* — Hanley, Flight & Zimmerman, LLC

(57) ABSTRACT

Methods and apparatus to reduce communications for position, navigation and timing (PNT) determinations are disclosed. A disclosed example apparatus to enable PNT determination for a mobile station includes at least one memory, machine readable instructions, and processor circuitry to at least one of instantiate or execute the machine readable instructions to identify features of signals of opportunity (SOOP) measured at a reference station, generate a model based on the identified features of the SOOP in conjunction with a position and a timing of the reference station, and provide at least one of the model or parameters associated with the model to the mobile station for the PNT determination.

17 Claims, 11 Drawing Sheets

(56) References Cited

U.S. PATENT DOCUMENTS

| | | | |
|---|---|---|---|
| 2013/0051434 A1 | 2/2013 | Draganov et al. | |
| 2013/0265193 A1* | 10/2013 | Kennedy | G01S 19/46 |
| | | | 342/357.29 |
| 2015/0226833 A1* | 8/2015 | Liu | G01S 5/021 |
| | | | 342/445 |
| 2018/0332557 A1 | 11/2018 | Vuornos et al. | |
| 2022/0196851 A1* | 6/2022 | Li | G01S 19/072 |

OTHER PUBLICATIONS

H. Benzerrouk, et al., "Iridium Next LEO Satellites as an Alternative PNT in GNSS Denied Environments—Part 1," Inside GNSS Media & Research LLC, Jun. 17, 2019, [https://insidegnss.com/iridium-next-leo-satellites-as-an-alternative-pnt-in-gnss-denied-environments-part-1/] retrieved on Oct. 31, 2024, 28 pages.

Khalife, et al., "The First Carrier Phase Tracking and Positioning Results with Starlink LEO Satellite Signals," DOI 10.1109/TAES.2021.3113880, IEEE Transactions on Aerospace and Electronic Systems, Sep. 20, 2021.

European Patent Office, "Extended European Search Report," issued in connection with European Patent Application No. 24151070, dated Sep. 3, 2024, 8 pages.

* cited by examiner

METHODS AND APPARATUS TO REDUCE COMMUNICATIONS FOR POSITION, NAVIGATION AND TIMING DETERMINATIONS

FIELD OF THE DISCLOSURE

This disclosure relates generally to position, navigation and timing (PNT) applications and, more particularly, to methods and apparatus to reduce communications for PNT determinations.

BACKGROUND

In recent years, signals of opportunity (SOOP) have been utilized for position, navigation and timing (PNT) applications. In particular, SOOP can correspond to any signal, such as radio frequency (RF) broadcast signals, cellular network signals, broadcast, etc., for navigation and positional determinations. In particular, the SOOP can be utilized for PNT determinations when global positioning signals (GPS) are relatively weak, cannot be used or are jammed.

Existing solutions for SOOP PNT determination compare signals received by a mobile station (e.g., a mobile user station, etc.) having an unknown position and timing with signals received from a reference station with a known corresponding position and timing. As a result, a timing and a position of the mobile station can be calculated. However, utilization of such an approach with a relatively high precision necessitates a relatively constant high bandwidth communication channel between the reference station and the mobile station to enable raw recordings of the SOOP to be compared, which typically occurs in a time-frequency correlation. In such known systems, these recordings can have relatively large data sets (e.g., 16-bit complex samples, at 1,000,000 samples per second for 10 milliseconds equating to 320,000 bits to transfer between the reference and mobile stations, etc.). In addition, this data transfer and/or calculations related thereto can necessitate a relatively significant amount of time, thereby potentially introducing latency in a solution calculation for the PNT. In other words, to utilize SOOP for navigational and/or timing determinations, infrastructure and/or equipment to support relatively constant high bandwidth communications with relatively low latency can be necessitated.

SUMMARY

An example apparatus to enable positioning, navigation and timing (PNT) determination for a mobile station includes at least one memory, machine readable instructions, and processor circuitry to at least one of instantiate or execute the machine readable instructions to identify features of signals of opportunity (SOOP) measured at a reference station, generate a model based on the identified features of the SOOP in conjunction with a position and a timing of the reference station, and provide at least one of the model or parameters associated with the model to the mobile station for the PNT determination.

An example non-transitory machine readable storage medium includes instructions that, when executed, cause processor circuitry to at least identify features of SOOP measured at a reference station, generate a model based on the identified features of the SOOP in conjunction with a position and a timing of the reference station, and provide at least one of the model or parameters associated with the model to a mobile station for a PNT determination corresponding to the mobile station.

An example method includes identifying, by executing instructions with processor circuitry, features of SOOP measured at a reference station, generating, by executing instructions with the processor circuitry, a model based on the identified features of the SOOP in conjunction with a position and a timing of the reference station, and transmitting, via a transmitter, at least one of the model or parameters associated with the model to a mobile station for a PNT determination corresponding to the mobile station.

Figure 1:
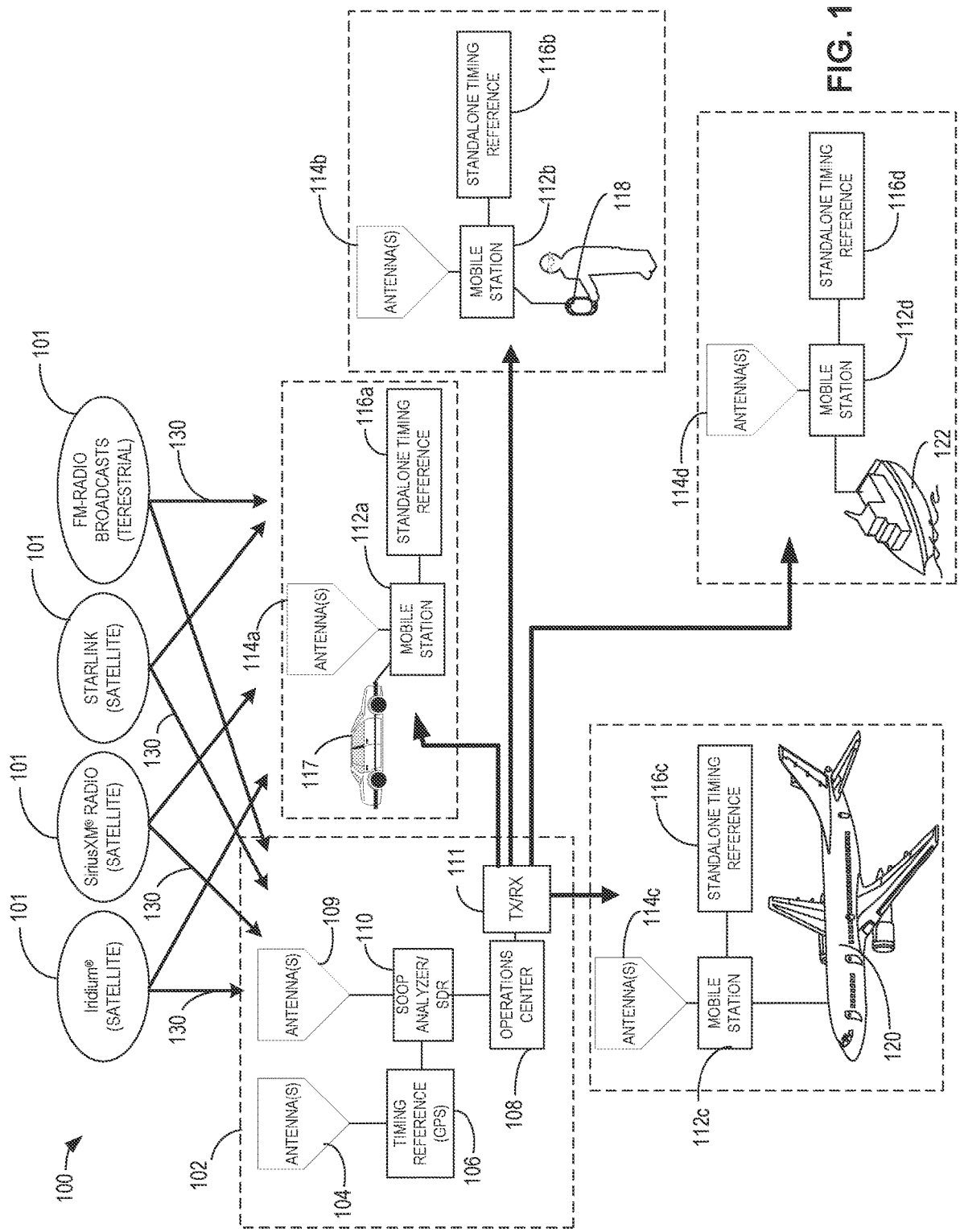
FIG. 1 depicts an example system in which examples disclosed herein can be implemented.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined, etc.) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/or indirect communication through one or more intermediary components, and does not require direct physical (e.g., wired, etc.) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors, etc.), and/or (ii) one or more general purpose semiconductor-based electrical circuits programmable with instructions to perform specific operations and including one or more semiconductor-based logic devices (e.g., electrical hardware implemented by one or more transistors, etc.). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof, etc.) and application programming interface(s) (API(s)) that may assign computing task(s) to whichever one(s) of the multiple types of processor circuitry is/are best suited to execute the computing task(s).

As used herein, the terms "mobile station" and "mobile user station" refer to a movable platform that utilizes PNT. Accordingly, the terms "mobile station" and "mobile user station" can refer to and/or be included in a vehicle (ground-based, water-based, submersible, spacecraft, etc.) that is manned or un-manned, a cell phone, a smart phone, a tablet, etc. As used herein, the term "reference station" refers to a device and/or system having a known position and timing that can be utilized as a reference in PNT determinations. Accordingly, the reference station, which can be stationary or mobile, may be any appropriate device and/or system including, but not limited to, a base station, a vehicle that is manned or un-manned, a mobile device, a cellular phone, spacecraft, a portable base station, etc.

DETAILED DESCRIPTION

FIG. 1 depicts an example system 100 in which examples disclosed herein can be implemented. In the illustrated example of FIG. 1, example SOOP sources 101 are both stationary and mobile, and are shown in conjunction with an example reference station 102. In turn, the reference station 102 of the illustrated example includes an antenna (e.g., an antenna array, etc.) 104, a timing reference 106, an operations center 108, and an SOOP analyzer 110, which is implemented as a software defined radio (SDR) in this example. In turn, the SOOP analyzer 110 includes and/or is communicatively coupled to an antenna 109, as well as a transceiver 111, which may be a wired or wireless transceiver. Alternatively, a transmitter is implemented instead of the transceiver 111. In this example, the reference station 102 is communicatively coupled to mobile stations 112a, 112b, 112c, 112d with corresponding antennas 114a, 114b, 114c, 114d and timing references (e.g., stand alone timing references, etc.) 116a, 116b, 116c, 116d, respectively. In this example, the mobile station 112a is associated with a ground-based vehicle (e.g., an automobile, a truck, a recreational vehicle (RV), a trailer, a tractor, a hovercraft, an unmanned ground-based vehicle, a tank, a robot, etc.) 117, the mobile station 112b is associated with a mobile device (e.g., a tablet, a phone, a laptop, etc.) 118, the mobile station 112c is associated with an aircraft 120, and the mobile station 112d is associated with a watercraft 122 (e.g., a boat, a submersible, a ship, an aircraft carrier, an oceanic platform, etc.).

In known implementations, SOOP, such as signals 130 transmitted from the SOOP sources 101, can be utilized for PNT determinations pertaining to the mobile station(s) 112. In particular, the signals 130 can originate from orbiting satellites or terrestrial sources for determination of a position and timing of a mobile station. The signals 130 can be utilized for navigation when GPS and/or GNSS signals are not available, for example. However, in contrast to GPS/GNSS, because the signals 130 are SOOP (e.g., any available RF signals can be categorized as SOOP, etc.), further analysis of the SOOP and/or characteristics associated with the SOOP is necessary for a PNT determination of the mobile station(s) 112. In particular, some known SOOP implementations utilize a relatively high bandwidth connection between the reference station 102 and the mobile station(s) 112 such that SOOP are compared therebetween to make PNT determinations for the mobile station(s) 112. The relatively high bandwidth connection can necessitate large data sets moving between the reference station 102 and the mobile station(s) 112. In particular, these high bandwidth requirements can necessitate specialized equipment and/or infrastructure and, thus, can limit mobility of the mobile station(s) 112.

Examples disclosed herein can be implemented to enable mobile platforms to effectively utilize SOOP for PNT determinations. Examples disclosed can enable increased mobility of platforms by utilizing a relatively small amount of data transferred between the reference station 102 and the mobile station(s) 112 and/or data that is pre-loaded onto the mobile station(s) 112. Examples disclosed herein can enable the mobile station(s) 112 to make PNT determinations in a relatively quick manner even in an area that has low levels of GPS/GNSS signals or in situations in which the GPS/GNSS signals are jammed. Examples disclosed herein can also reduce bandwidth and computational needs and, thus, cost and complexity by foregoing the real-time comparison of SOOP utilized in known implementations.

In contrast to known implementations, to make PNT determinations and/or calculations, examples disclosed herein utilize the reference station 102 to analyze SOOP to generate and/or define parameters of the SOOP via a model. For example, the model is generated at the reference station 102 based on captured, recorded and/or charted SOOP. In some examples, the model is utilized to generate and/or predict parameters of the SOOP. The parameters and/or the model are then provided to the mobile station(s) 112 for PNT determinations to be performed by the mobile station(s) 112. As a result, the mobile station(s) 112 can determine timing as well as position with a relatively high degree of accuracy (e.g., for navigation purposes, etc.). In this example, the mobile station(s) 112 are pre-loaded with parameters and/or a model pertaining to the SOOP prior to being deployed (e.g., launched, etc.) for subsequent PNT determination. Additionally or alternatively, the parameters and/or the model are transmitted (e.g., transmitted periodically or transmitted when requested, etc.) to the mobile station(s) 112 subsequent to the mobile(s) stations 112 being deployed. The parameters can correspond to frequency, bandwidth, timed shifts, timing reference information, epoch and drift, SOOP transmitter location/position, satellite signal strength characteristics at different positions, satellite two-line elements, latitude, longitude, and/or altitude, etc. However, any other appropriate aspects and/or variables can be characterized in the parameters.

According to some examples disclosed herein, the parameters and/or the model are updated at the reference station 102 and forwarded/provided to the mobile station(s) 112 after being updated. For example, the reference station 102 transmits parameters and/or the model to the mobile station (s) 112 in response to determining the SOOP, parameters of the SOOP and/or characteristics of the SOOP have changed to a significant degree (e.g., a degree of change that exceeds a threshold degree of change, etc.). Additionally or alternatively, the parameters and/or the model are transmitted/forwarded between the mobile stations 112 such that at least one of the mobile stations 112 provides the parameters and/or the model to another of the mobile stations 112. In some such examples, a first one of the mobile stations 112 that is within a communication range (e.g., a wireless communication range, etc.) of the reference station 102 can provide parameters to a second one of the mobile stations that is out of the communication range of the reference station 102.

In some examples, the reference station 102 develops and/or generates the model based on ML/AI, as will be discussed in greater detail below in connection with FIG. 4. In some such examples, the model is trained with training data including SOOP characteristics/observations (e.g., SOOP graphs/charts, waveforms, measurable characteristics, etc.) in conjunction with corresponding parameters of the SOOP (e.g., position and timing of the SOOP, etc.). In some particular examples, at least one of the mobile stations 112 switches from utilizing GPS/GNSS signals to utilizing the SOOP for PNT determinations/calculations when the GPS/GNSS signals are unavailable (e.g., low signal strength, etc.) and/or jammed.

Figure 2:
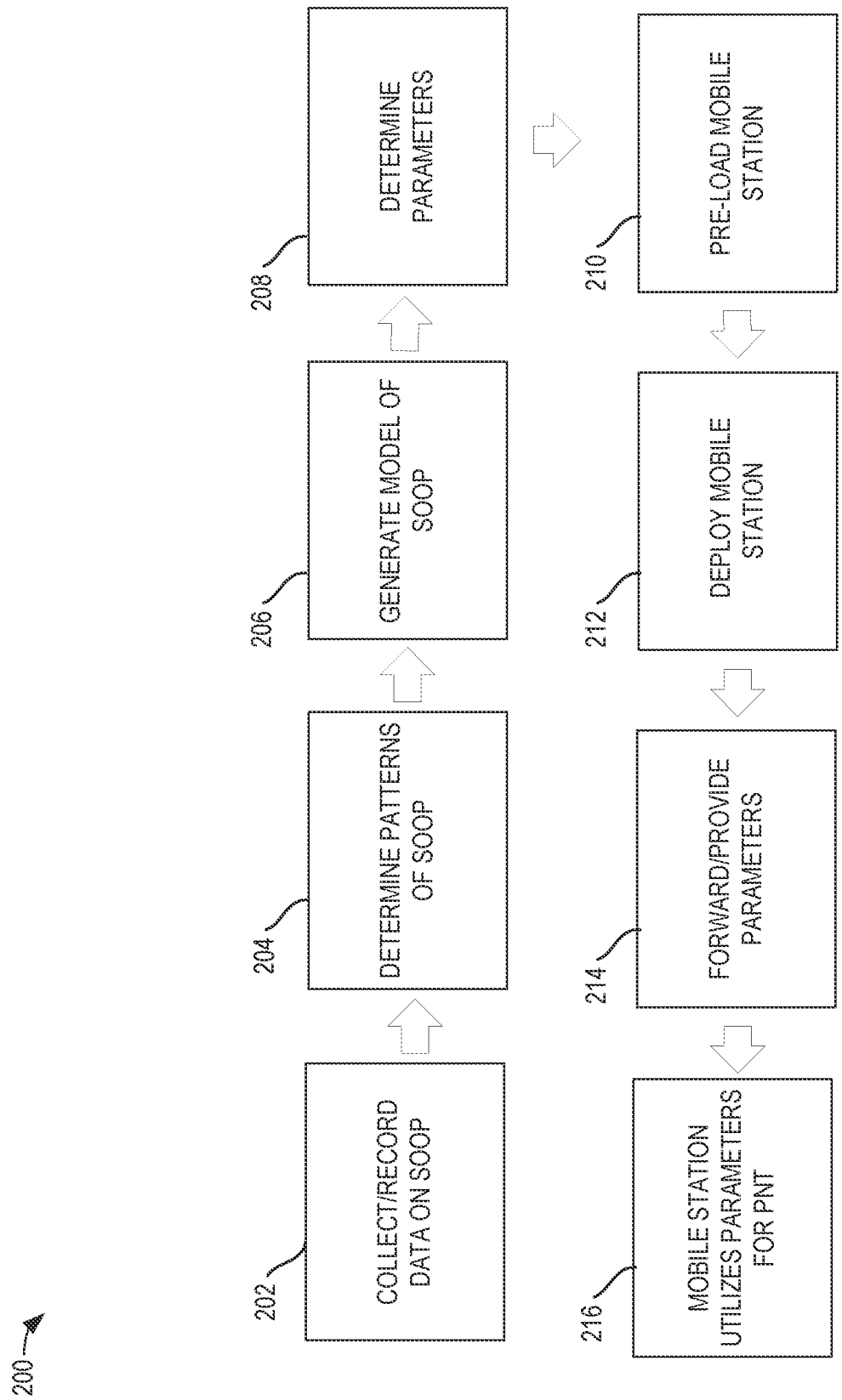
FIG. 2 depicts an example process flow in accordance with teachings of this disclosure.

FIG. 2 depicts an example process flow 200 in accordance with teachings of this disclosure. At step 202, the example reference station 202 collects and/or records data corresponding to SOOP. In particular, a position and timing of the reference station 102 is known such that the data corresponding to the SOOP can be analyzed and/or characterized. The data corresponding to the SOOP can be stored in any appropriate format (e.g., raw data, amplitude-frequency spectrum plots at different times, radio-level shift data, etc.). The data can be recorded over a few hours, a few days or a few months, for example.

At step 204, patterns and/or characteristics of the SOOP are determined based on the collected data. The patterns and/or characteristics of the SOOP can include, but are not limited to, waveform shapes, bandwidth range, frequency peak characteristics, frequency range, shifts in frequency, timed signal shifts, etc.

At step 206, a model of the SOOP is developed and/or generated. As mentioned above in connection with FIG. 1, the model can be developed and/or generated by utilizing mathematical modelling (e.g., polynomial fits, etc.) and/or ML/AI. In this example, the model is utilized to predict and/or extrapolate aspects of the SOOP for subsequent utilization thereof in a PNT determination by the mobile station 112. In other words, the model can be utilized by the mobile station 112 to predict characteristics of the SOOP in the future (e.g., as a function of time, etc.) for PNT determinations.

At step 208, in some examples, parameters associated with the SOOP and/or the model are determined, calculated and/or generated. In particular, the parameters can be generated based on the model (e.g., the parameters are output of the model, etc.). According to some examples disclosed herein, the parameters can correspond to a predicted timing and frequency of the SOOP for use by the mobile station 112.

At step 210, according to some examples, the parameters and/or the model are pre-loaded onto the mobile station(s) 112. In some such examples, the mobile station(s) 112 are provided with the parameters and/or the model prior to the mobile station(s) being deployed.

At step 212, the mobile station 112 is deployed (e.g., launched, an aircraft carrying the mobile station 112 has taken off, a user carrying the mobile station 112 walks to a threshold distance away from the reference station 102, etc.). According to some examples disclosed herein, the mobile station 112 moves and or is deployed beyond a communication/transmission range of the reference station 102.

At step 214, according to examples disclosed herein, the parameters and/or the model are provided (e.g., transmitted, etc.) to the mobile station 112. In some examples, the parameters and/or the model are transmitted (e.g., via a wired or wireless communication interface, etc.) to the mobile station 112 after the mobile station is deployed.

At step 216, the mobile station 112 of the illustrated example utilizes the parameters and/or the model for PNT calculations and/or determinations related to a position and timing of the mobile station 112. For example, the mobile station 112 utilizes the parameters to determine a frequency, timing and/or position of the SOOP detected and/or measured by the mobile station 112. As a result, the mobile station 112 can determine its respective position and timing even if incapable of utilizing GPS/GNSS signals, for example.

Figure 3:
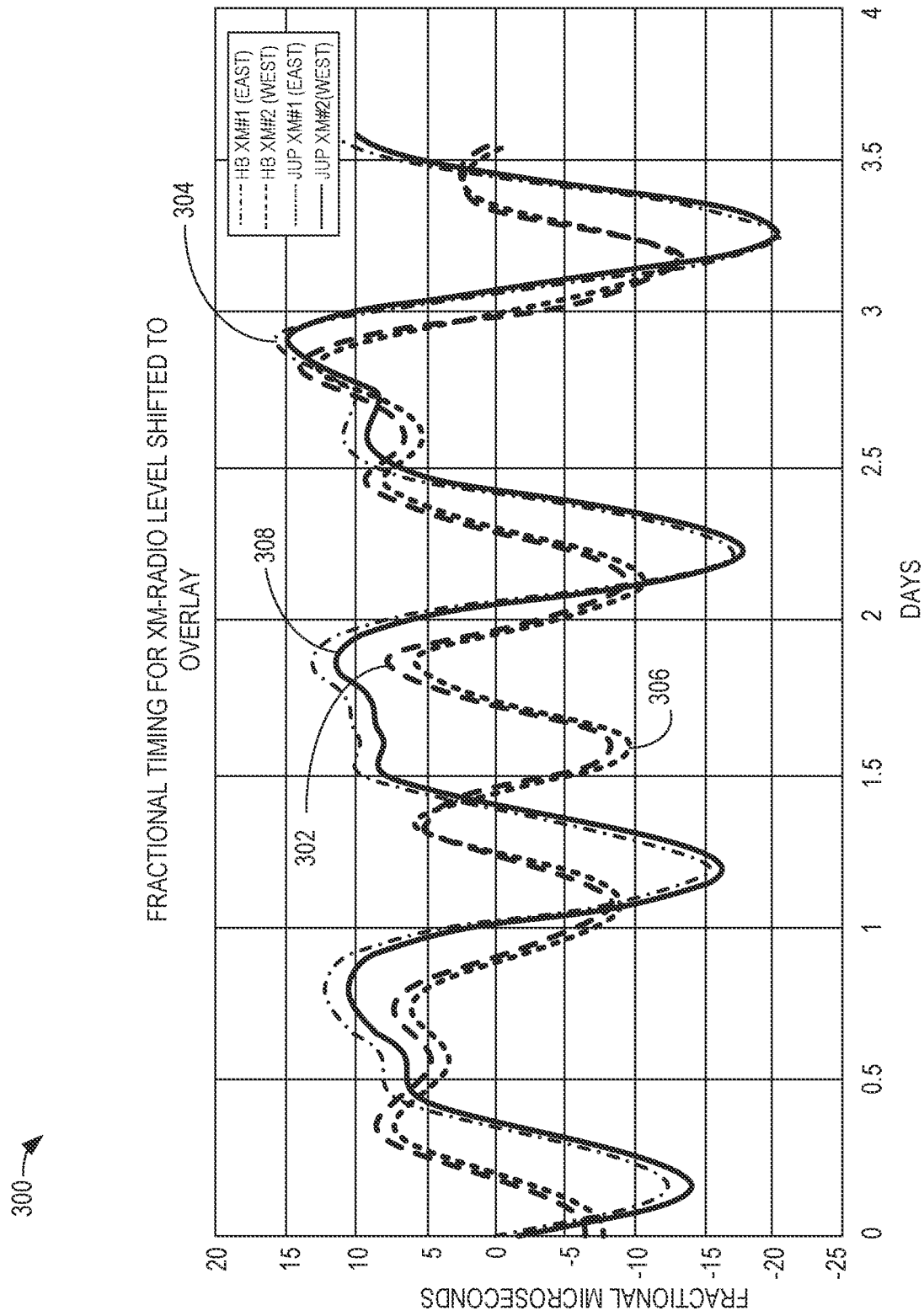
FIG. 3 depicts an example plot of example signals that can be analyzed by examples disclosed herein.

FIG. 3 depicts an example plot 300 of signals that can be analyzed by examples disclosed herein. In particular, the example signals shown in FIG. 3 are broadcast signals that are utilized as SOOP, but are not associated with GPS/GNSS systems. The example plot 300 depicts fractional timing (vertical axis) in microseconds as a function of time in days (horizontal axis). As can be seen in the illustrated example of FIG. 3, a curve 302 corresponds to measurements of fractional timing of a first satellite captured at the West coast of the United States while a curve 304 corresponds to fractional time of a second satellite at the West Coast of the United States. Further, a curve 306 corresponds to fractional timing of the first satellite at the East Coast of the United States while a curve 308 corresponds to fractional timing of the second satellite at the East Coast of the United States. In this example, the first and second satellites are not utilized for GPS/GNSS functions. Instead, the first and second satellites correspond to SOOP transmission (e.g., broadcast signals, etc.).

As can be seen in the illustrated example of FIG. 3, the curves 302, 306 corresponding to the first satellite generally align with one another even considering the vast difference in location. Similarly, the curves 304, 308 corresponding to the second satellite also generally align with one another. Accordingly, non-terrestrial signals (e.g., signals transmitted from satellites, etc.) not intended for GPS/GNSS use can be utilized as SOOP. While a fractional timing curve is shown, examples disclosed herein can utilize any appropriate signal types, metrics or parameters. For example, examples disclosed herein can utilize frequency spectrum characteristics to characterize SOOP, shifts, timing patterns, etc.

To characterize the SOOP for subsequent PNT determinations and/or calculations, in some examples, mathematical equations are fit (e.g., a polynomial fit, a linear fit, etc.) to curves. For example, polynomial functions and/or equations can be fit to any of the curves 302, 304, 306, 308. In some examples, changes to and/or shifts of the curves 302, 304, 306, 308 over time (e.g., periodically, etc.) can be characterized. In particular examples, different models and/or equations can represent different repeating phases and/or shifting of the SOOP (e.g., a first equation is fit to a first signal for a first duration transmitted by a satellite followed by a second duration with a corresponding to a second equation fit to a second signal also transmitted by the satellite that is different from the first signal, etc.).

Figure 4:
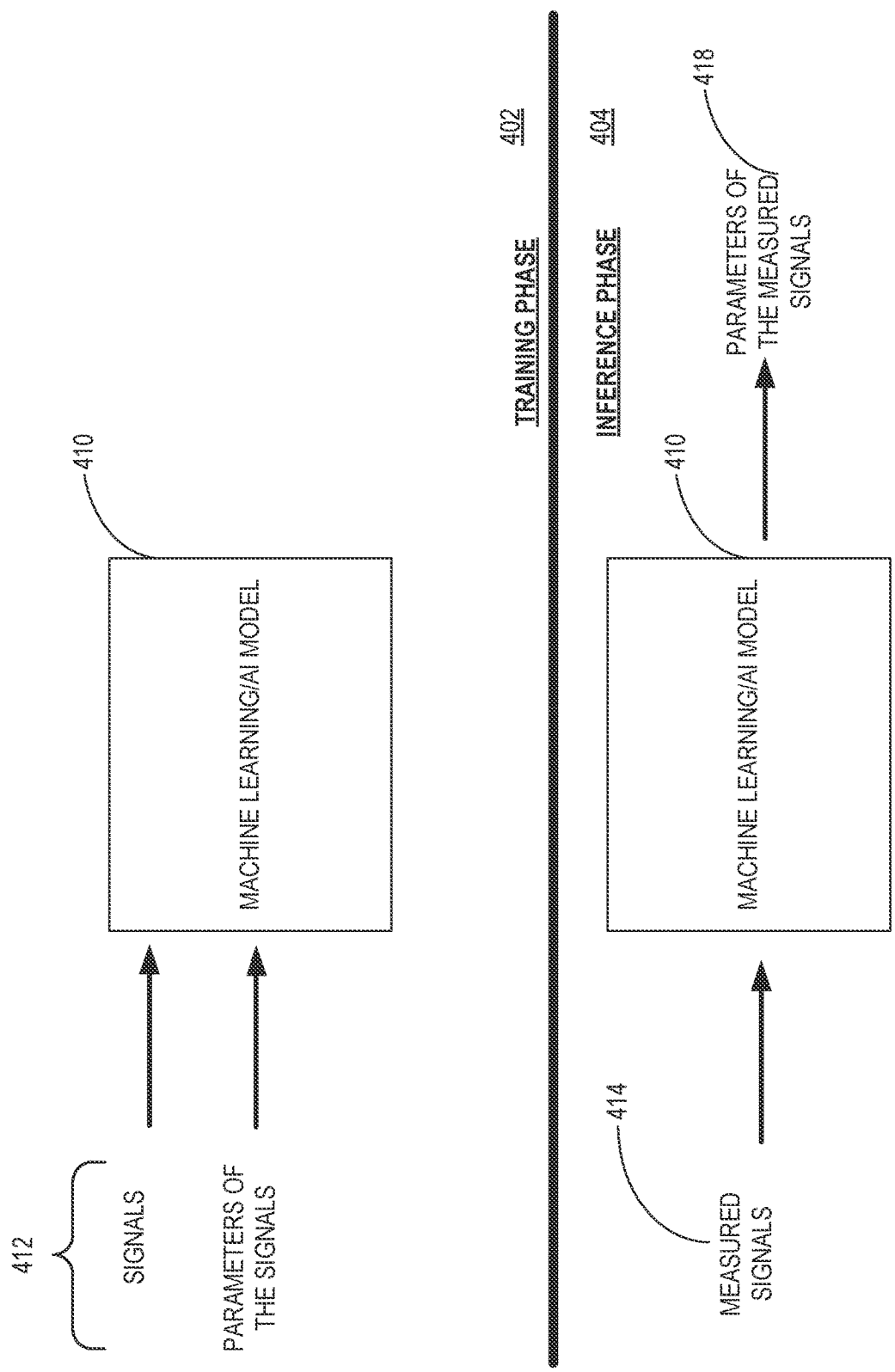
FIG. 4 depicts an example machine learning implementation that can be implemented in examples disclosed herein.

FIG. 4 depicts an example ML implementation that can be implemented in examples disclosed herein. As mentioned above, examples disclosed herein may utilize AI, including ML, deep learning (DL), and/or other artificial machine-driven logic, all of which can enable machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a long short-term memory networks (LSTM) model is used. However, other types of machine learning models could additionally or alternatively be used such as Recurrent Neural Network (RNN), a convolutional neural network (CNN), etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled, etc.) outputs to select parameters (e.g., by iterating over combinations of select parameters, etc.) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs, etc.).

In examples disclosed herein, ML/AI models are trained. In examples disclosed herein, training is performed until an acceptable amount of error in characterizing signals is achieved. In examples disclosed herein, training is performed at a reference station. Training is performed using hyperparameters that control how the learning is performed (e.g., a learning rate, a number of layers to be used in the machine learning model, etc.). In some examples re-training may be performed. For example, such re-training may be performed in response to a change in signal characteristics and/or inaccuracies discovered in the trained model.

Training is performed using training data. In examples disclosed herein, the training data originates from known or previously characterized signals (e.g., SOOP, etc.). Because supervised training is used, the training data is labeled. In some examples, the training data is pre-processed.

Once training is complete, the model is deployed for use as an executable construct that processes an input and provides an output based on the network of nodes and connections defined in the model.

Once trained, the deployed model may be operated in an inference phase to process data. In the inference phase, data to be analyzed (e.g., live data, etc.) is input to the model, and the model executes to create an output. This inference phase can be thought of as the AI "thinking" to generate the output based on what it learned from the training (e.g., by executing the model to apply the learned patterns and/or associations to the live data, etc.). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

In the illustrated example of FIG. 4, a training phase 402 and an inference phase 404 are depicted. In the training phase 402, a model 410 is provided with training data 412, which includes known signals (e.g., signal characteristics, a signal history, etc.), as well as known corresponding parameters and/or characteristics thereof. Once the model 410 is trained (e.g., sufficiently trained, etc.), the model 410 is provided with inputs 414, which are signals and/or signal characteristics measured by the mobile station 112 in this example. The model 410 may be executed by the mobile station 112 to generate outputs 418 that correspond to information of the signals measured by the mobile station 112. The outputs 418 can correspond to timing/frequency of the SOOP and/or a position of a source (e.g., a satellite, etc.) providing and/or transmitting the SOOP. Alternatively, in some examples, the reference station 102 executes and/or utilizes the model 410 to provide parameters of the model 410 to the mobile station 112 (e.g., as a time-based function, predicted signal characteristics or behavior, etc.).

While the examples disclosed herein pertain to a model that utilizes signal-related training data, in other examples, different aspects can be used in training a model. For example, an ML model that characterizes a position of an SOOP source satellite based on aspects of measured signals at the reference station 102 can be developed. In turn, the model can be deployed to determine the position of the SOOP source satellite based on signal characteristics measured at the mobile station 112. Additionally or alternatively, the model can be trained based on aspects of differences between ones of SOOP (e.g., signal delays between ones of SOOP, etc.).

Figure 5:
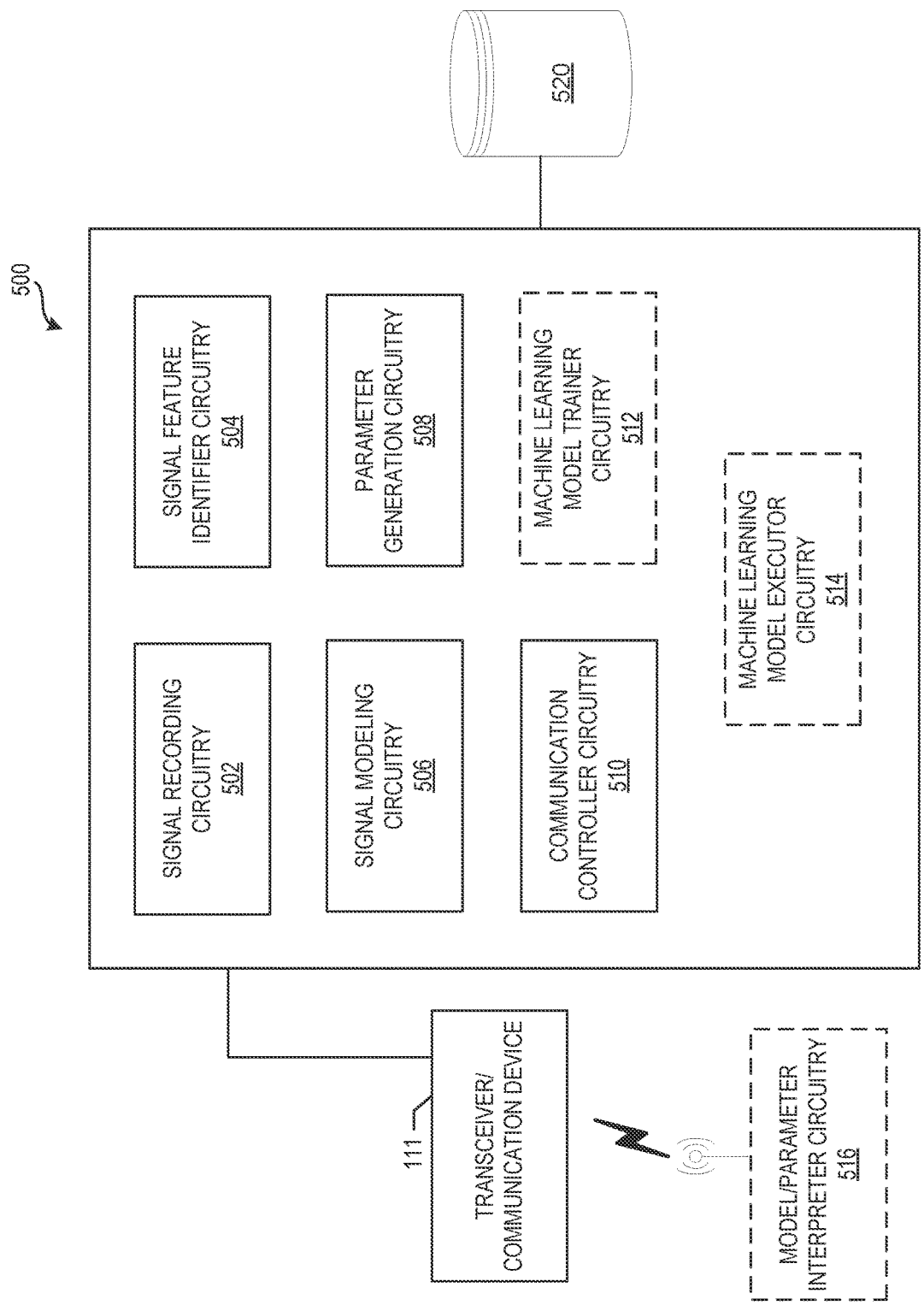
FIG. 5 is a block diagram of an example signal analysis system in accordance with teachings of this disclosure.

FIG. 5 is a block diagram of an example signal analysis system 500 to characterize and model SOOP for PNT determinations. The example signal analysis system 500 can be implemented in the example reference station 102, the example SOOP analyzer 110, the example operations center 108 and/or the mobile station 112. The signal analysis system 500 of FIG. 5 may be instantiated (e.g., creating an instance of, bring into being for any length of time, materialize, implement, etc.) by processor circuitry such as a central processing unit executing instructions. Additionally or alternatively, the signal analysis system 500 of FIG. 5 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 5 may, thus, be instantiated at the same or different times. Some or all of the circuitry may be instantiated, for example, in one or more threads executing concurrently on hardware and/or in series on hardware. Moreover, in some examples, some or all of the circuitry of FIG. 5 may be implemented by microprocessor circuitry executing instructions to implement one or more virtual machines and/or containers.

The example signal analysis system 500 includes example signal recording circuitry 502, example signal feature identifier circuitry 504, example signal modeling circuitry 506, example parameter generation circuitry 508, example communication controller circuitry 510, example machine learning model trainer circuitry 512, and example machine learning model executor circuitry 514. In some examples, the signal analysis system 500 includes and/or is communicatively coupled to the transceiver 111. Additionally or alternatively, the signal analysis system includes and/or is communicatively coupled to example model/parameter interpreter circuitry 516, which can be implemented in the mobile station 112. In this example, data pertaining to SOOP, model data and/or parameter data is stored in a data storage 520.

The signal recording circuitry 502 of the illustrated example is implemented to record, compile and/or store aspects/data of the SOOP. For example, the signal recording circuitry 502 can record data corresponding to the SOOP over a period of a few hours, a few days, a few weeks or a few years. In some examples, the recorded data can correspond to waveforms (e.g., amplitude-frequency waveforms) of the SOOP recorded over time and/or at different times. According to some examples disclosed herein, data is obtained for multiple SOOP types (e.g., SiriusXM® radio signals in combination with Starlink signals, etc.). In some examples, prior to recording data of the SOOP, the signal recording circuitry 502 determines that the SOOP has a requisite level of stability (e.g., a threshold level of stability, etc.) such that the SOOP is stable enough for predictions to be made. In this example, the recorded data is stored in the aforementioned data storage 520. In some examples, the signal recording circuitry 502 is instantiated by processor circuitry executing signal recording instructions and/or configured to perform operations such as those represented by the flowcharts of FIGS. 6 and 7.

According to examples disclosed herein, the signal feature identifier circuitry 504 is utilized to determine/characterize features and/or aspects of the SOOP. In particular, the signal feature identifier circuitry 504 can determine an overall bandwidth of the SOOP, a frequency range of the SOOP, a frequency peak of the SOOP, shifts in the SOOP, patterns of shifts of the SOOP, a waveform of the SOOP, a position of the SOOP source, etc. In some examples, the signal feature identifier circuitry 504 is instantiated by processor circuitry executing signal feature identifier instructions and/or configured to perform operations such as those represented by the flowcharts of FIGS. 6 and 7.

The example signal modeling circuitry 506 is implemented to generate and/or develop a model corresponding to the SOOP. According to examples disclosed herein, the model can predict a behavior and/or measurable aspects of the SOOP with respect to time. In other words, the model can be a function of time (e.g., an equation that models behavior of the SOOP as a function of time, a model that predicts timed shifts in the SOOP, etc.). For example, the model can be based on timing and frequency of the SOOP. In some examples, the signal modeling circuitry 506 is instantiated by processor circuitry executing signal modeling circuitry instructions and/or configured to perform operations such as those represented by the flowcharts of FIGS. 6 and 7.

According to examples disclosed herein, parameter generation circuitry 508 can be utilized to generate parameters corresponding to the SOOP. The parameters can be related to the aforementioned model. Additionally or alternatively, the parameters can represent predicted aspects of the SOOP (e.g., predictions based on the model of the SOOP, etc.). In some examples, the parameter generation circuitry 508 is instantiated by processor circuitry executing parameter generation instructions and/or configured to perform operations such as those represented by the flowcharts of FIGS. 6 and 7.

The communication controller circuitry 510 of the illustrated example is implemented to provide the model and/or the parameters associated with the SOP to the mobile station 112. In particular, the model and/or the parameters can be provided to the mobile station 112 prior to deployment thereof. In some examples, the communication controller circuitry 510 is instantiated by processor circuitry executing communication controller instructions and/or configured to perform operations such as those represented by the flowcharts of FIGS. 6 and 7.

In some examples, the machine learning model trainer circuitry 512 is implemented to train the model utilizing AI, ML and/or DL. According to some examples disclosed herein, the model is trained with data pertaining to known and/or previously recorded SOOP along with corresponding parameters, patterns and/or features of the known SOOP. In some examples, the machine learning model trainer circuitry 512 is instantiated by processor circuitry executing machine learning model trainer instructions and/or configured to perform operations such as those represented by the flowcharts of FIGS. 6 and 7.

In some examples, the machine learning model executor circuitry 514 is implemented to execute the trained model. In some such examples, data and/or characteristics of the SOOP are provided by the machine learning model executor circuitry 514 to the model. In turn, the model outputs parameters of the SOOP (e.g., timing and/or frequency of the SOOP, etc.) that can be utilized in PNT determinations by the mobile station 112. In some examples, the machine learning model executor circuitry 514 is instantiated by processor circuitry executing machine learning model executor instructions and/or configured to perform operations such as those represented by the flowcharts of FIGS. 6 and 7.

In some examples, the model/parameter interpreter circuitry 516 is implemented to utilize the model and/or the parameters in PNT determinations for the mobile station 112. In some examples, the model/parameter interpreter circuitry 516 is instantiated by processor circuitry executing model/parameter interpreter circuitry instructions and/or configured to perform operations such as those represented by the flowcharts of FIGS. 6 and 7.

While an example manner of implementing the signal analysis system 500 of FIG. 5 is illustrated in FIG. 5, one or more of the elements, processes, and/or devices illustrated in FIG. 5 may be combined, divided, re-arranged, omitted, eliminated, and/or implemented in any other way. Further, the example signal recording circuitry 502, the example signal feature identifier circuitry 504, the example signal modeling circuitry 506, the example parameter generation circuitry 508, the example communication controller circuitry 510, the example machine learning model trainer circuitry 512, the example machine learning model executor circuitry 514, the example model/parameter interpreter circuitry 516, and/or, more generally, the example signal analysis system 500 of FIG. 5, may be implemented by hardware alone or by hardware in combination with software and/or firmware. Thus, for example, any of the example signal recording circuitry 502, the example signal feature identifier circuitry 504, the example signal modeling circuitry 506, the example parameter generation circuitry 508, the example communication controller circuitry 510, the example machine learning model trainer circuitry 512, the example machine learning model executor circuitry 514, the example model/parameter interpreter circuitry 516 and/or, more generally, the example signal analysis system 500, could be implemented by processor circuitry, analog circuit(s), digital circuit(s), logic circuit(s), programmable processor(s), programmable microcontroller(s), graphics processing unit(s) (GPU(s), digital signal processor(s) (DSP(s)), application specific integrated circuit(s) (ASIC(s)), programmable logic device(s) (PLD(s)), and/or field programmable logic device (s) (FPLD(s)) such as Field Programmable Gate Arrays (FPGAs). Further still, the example signal analysis system 500 of FIG. 5 may include one or more elements, processes, and/or devices in addition to, or instead of, those illustrated in FIG. 2, and/or may include more than one of any or all of the illustrated elements, processes and devices.

Figure 6:
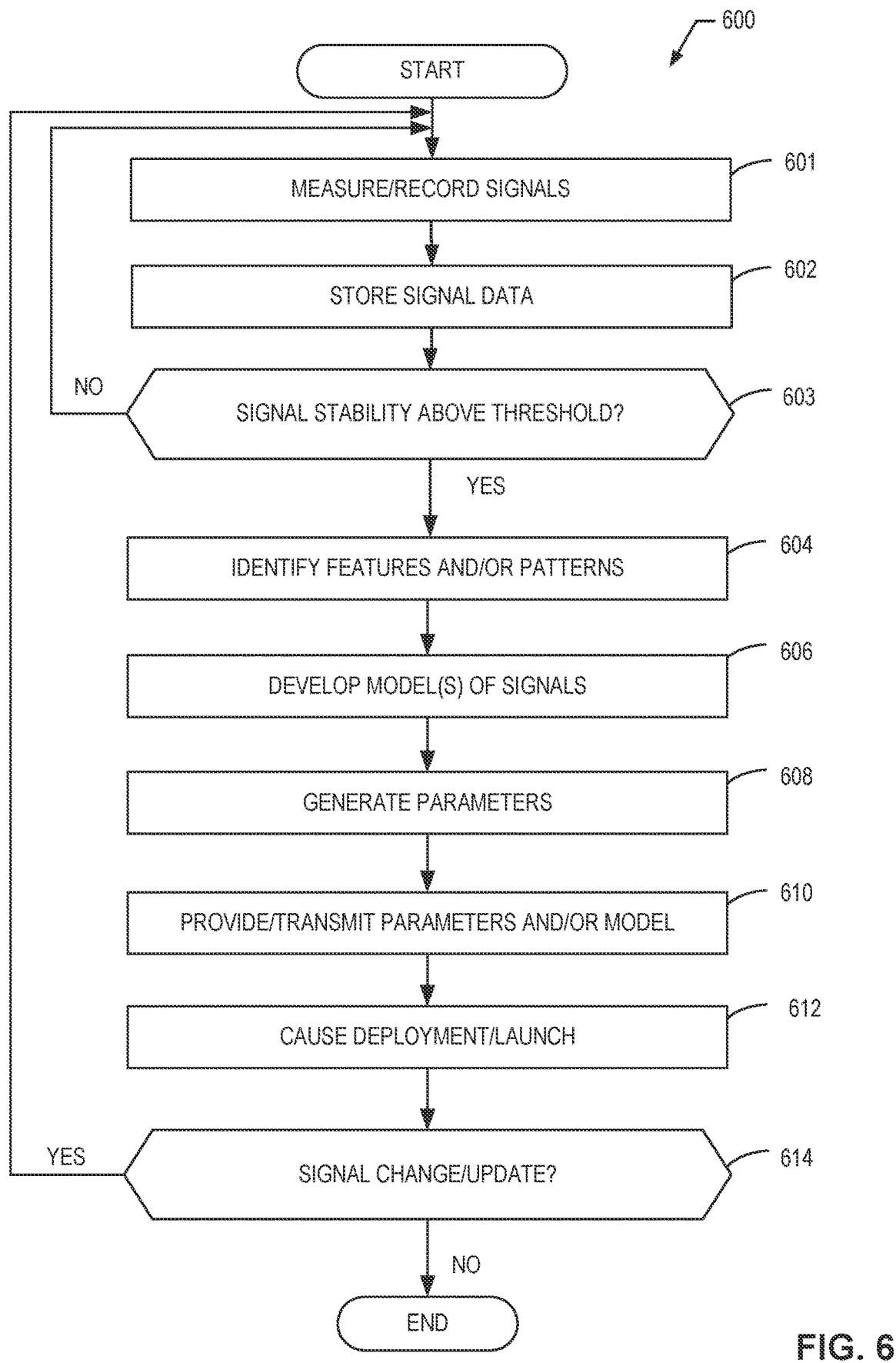
FIGS. 6 and 7 are flowcharts representative of example machine readable instructions and/or example operations that may be executed by example processor circuitry to implement the example signal analysis system of FIG. 5.
Figure 7:
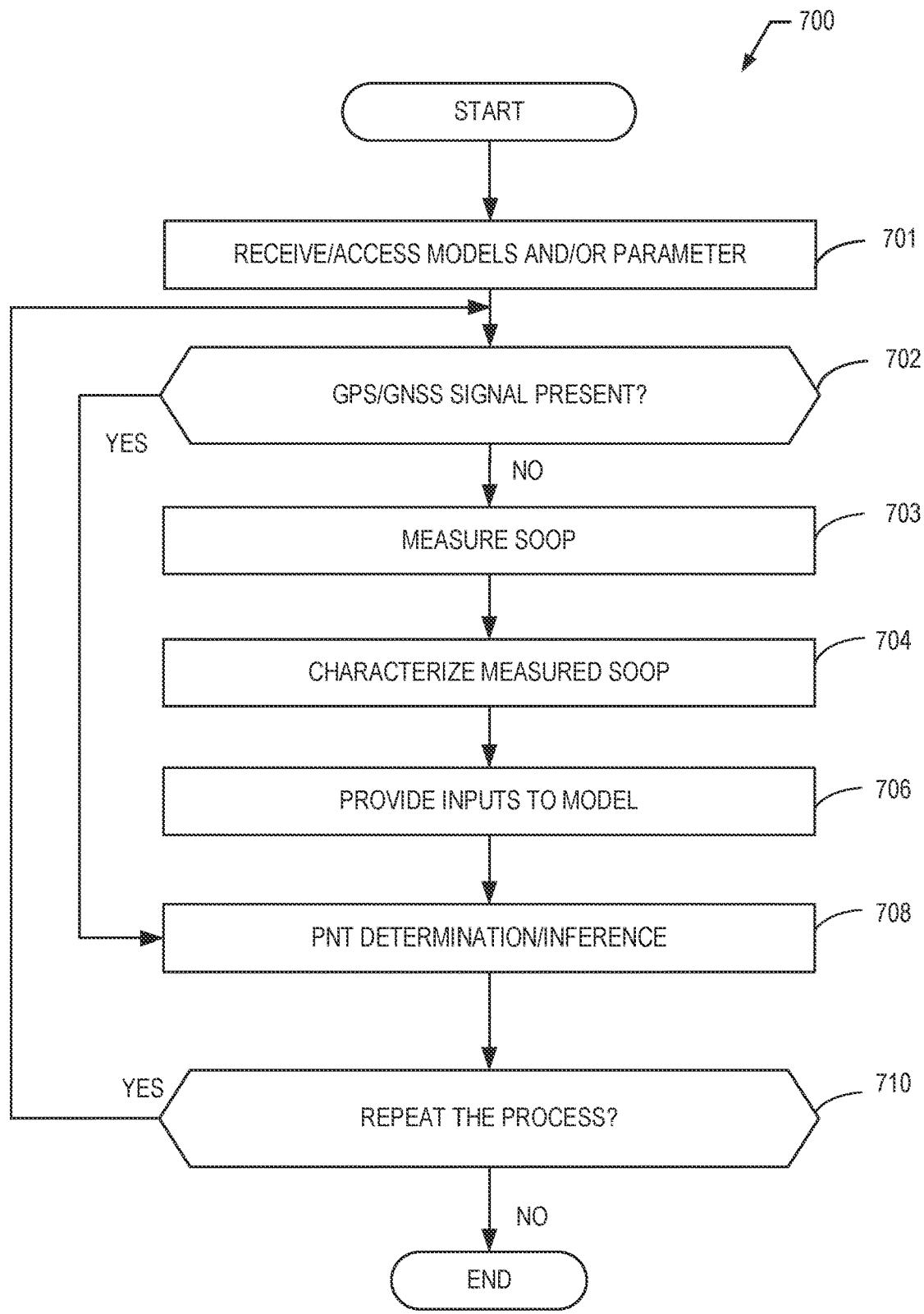

Flowcharts representative of example machine readable instructions, which may be executed to configure processor circuitry to implement the signal analysis system 500 of FIG. 5, are shown in FIGS. 6 and 7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry 812 discussed below in connection with FIGS. 9 and/or 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device, etc.). For example, the client hardware device may be implemented by an endpoint client hardware device (e.g., a hardware device associated with a user, etc.) or an intermediate client hardware device (e.g., a radio access network (RAN), etc.) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 6 and 7, many other methods of implementing the example signal analysis system 500 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers, etc.) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts, when decrypted, decompressed, and/or combined, form a set of machine executable instructions that implement one or more operations that may together form a program such as that described herein.

In another example, the machine readable instructions may be stored in a state in which they may be read by processor circuitry, but require addition of a library (e.g., a dynamic link library (DLL), etc.), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6 and 7 may be implemented using executable instructions (e.g., computer and/or machine readable instructions, etc.) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information, etc.). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

FIG. 6 is a flowchart representative of example machine readable instructions and/or example operations 600 that may be executed and/or instantiated by processor circuitry to analyze signals and forward a model and/or parameters associated with the model to the mobile station 112. The machine readable instructions and/or the operations 600 of FIG. 6 begin at block 601, at which the example signal recording circuitry 502 records and/or receives data and/or signals associated with SOOP over time (e.g., over hours, weeks, months, years, etc.). According to some examples disclosed herein, the example signal recording circuitry 502 determines whether sufficient data has been obtained from the SOOP.

At block 602, the example signal recording circuitry 502 stores the aforementioned data associated with the signals in the data storage 520. According to examples the disclosed herein, the data stored can pertain to signal characteristics and/or shifts over a period of time, such as days or weeks, for example.

At block 603, the signal recording circuitry 502 and/or the signal feature identifier circuitry 504 of the illustrated example determines whether the signals are stable and/or predictable to a threshold degree such that the signals can be modeled/predicted and/or modeled with sufficient accuracy. In particular, the signal recording circuitry 502 and/or the signal feature identifier circuitry 504 can determine whether the SOOP is stable enough to be characterized and/or analyzed (e.g., the SOOP is stable enough and changes predictably such that patterns are determinable, etc.). If the signal recording circuitry 502 and/or the signal feature identifier circuitry 504 determines that the signals are stable and/or predictable to the threshold degree (block 603), the process proceeds to block 604. Otherwise, the process returns to block 601.

At block 604, the example signal feature identifier circuitry 504 identifies features and/or patterns of the recorded and/or received signals. In particular, the example signal feature identifier circuitry 504 analyzes and/or characterizes the behavior of the received signals over time (e.g., historical shifts and/or changes, etc.). According to examples disclosed herein, the patterns and/or the features can pertain to, but are not limited to, frequency range(s), frequency peak(s), signal strength based on positions of SOOP sources (e.g., positions and/or ephemeris of satellites, etc.), frequency shifts, Doppler shifts, bandwidth, shifts in bandwidth, frequency ambiguity, periodicity, I/Q signal characteristics, noise, timing drift, a framing pattern, interleaving, scrambling, forward-error corrections, etc.

At block 606, the example signal modeling circuitry 506 generates and/or develops model(s) of the signals. In this example, the model(s) are generated based on the identified features of the signals in conjunction with known a known timing and position of the reference station 102. According to examples disclosed herein, the model(s) can be time-based functions such that characteristics of the signal are predicted and, accordingly, providing the model with a time (e.g., an input time in the future, etc.) as an input can cause the model to output at least one predicted characteristic and/or behavior of the signal at the provided time. Additionally or alternatively, periods between different signals (e.g., SOOP, etc.) and/or signal features of different signals are utilized. According to examples disclosed herein, the model can correspond to an ephemeris and/or almanac associated with a satellite or other moving reference that transmits signals that can be utilized for PNT determinations. In some examples, as mentioned above, the model is developed and/or generated by the machine learning model trainer circuitry 512 utilizing ML, DL and/or AI.

At block 608, according to some examples disclosed herein, the parameter generation circuitry 508 of the illustrated example generates, calculates and/or determines parameters of the signals. In particular, the example parameter generation circuitry 508 can be utilized to determine parameters of the signals at subsequent/future times based on the model. In some particular examples, the parameters are time-based, expected and/or predicted characteristics of the signal. In other words, the parameters can correspond to predicted characteristics of the signal at subsequent/future points in time. Additionally or alternatively, the parameter generation circuitry 508 and/or the machine learning model executor circuitry 514 executes the model to determine and/or generate the aforementioned parameters.

At block 610, the example communication controller circuitry 510 provides and/or causes a transmitter to transmit the parameters and/or the model associated with the signal to the mobile station 112. The parameters and/or the model can be provided to the mobile station 112 prior to the mobile station leaving an area of GPS/GNSS coverage such that the mobile station 112 can make PNT determinations utilizing other signals than those associated with GPS/GNSS without constant relatively high bandwidth communications to the reference station 102, for example. Additionally or alternatively, the parameters and/or the model can be provided to the mobile station 112 prior to the mobile station 112 being launched, taking off and/or being deployed. According to some examples, updated parameters and/or models can be transmitted from the reference station 102 to the mobile station 112 (e.g., periodically or when characteristics of the signal have changed beyond a threshold degree of change, etc.). In some such examples, the mobile station 112 can request an updated model and/or model parameters when the mobile station 112 is having difficulty making PNT determinations.

At block 612, the mobile station 112 is caused to be deployed and/or launched by the example communication controller circuitry 510. The mobile station 112 can be associated with a vehicle, a projectile, an unmanned aerial vehicle (UAV), a personal computing device, etc.

At block 614, the example signal recording circuitry 502 determines whether the signal has changed to a degree that meets or exceeds a threshold degree of change. If the signal has changed to the degree that meets or exceeds the threshold degree of change (block 612), control of the process returns to block 601. Otherwise, the process ends. The example signal recording circuitry 502 may make this determination based on data and/or signals recorded with the example signal recording circuitry 502.

FIG. 7 is a flowchart representative of example machine readable instructions and/or example operations 700 that may be executed and/or instantiated by processor circuitry to perform and/or enable PNT determinations for the mobile station 112. In particular, the example operations 700 may be performed at the mobile station 112 when the mobile station 112 can no longer utilize GPS/GNSS signals for PNT determinations.

At block 701, the example model/parameter interpreter circuitry 516 receives and/or accesses a model and/or parameters corresponding to the model (e.g., parameters as output of the model, a function of time generated by the model, etc.).

At block 702, the example model/parameter interpreter circuitry 516 determines a presence and/or an availability of a GPS/GNSS signal. If the GPS/GNSS signal is not present and/or available (block 702), control of the process proceeds to block 703. Otherwise, the process proceeds to block 708 for a PNT determination based on the GPS/GNSS signals.

At block 703, in this example, the model/parameter interpreter circuitry 516 causes a receiver of the mobile station 112 to receive and/or measure SOOP. In some examples, the model/parameter interpreter circuitry 516 selects at least one of the SOOP to be measured.

At block 704, in some examples, the example model/parameter interpreter circuitry 516 characterizes and/or determines parameters of the measured SOOP (e.g., for subsequent PNT determination, etc.).

At block 706, in some examples, the example model/parameter interpreter circuitry 516 provides the parameters of the signals measured at the mobile station 112 as inputs to the model provided to the mobile station 112 from the reference station 102.

In the illustrated example, at block 708, the example model/parameter interpreter circuitry 516 makes a PNT determination/inference based on comparing first parameters of the SOOP measured at the mobile station 112 with a model and/or second parameters associated with the model to make a PNT determination or inference regarding the mobile station 112.

At block 710, the example the example model/parameter interpreter circuitry 516 determines whether to repeat the process. If the process is to be repeated (block 710), control of the process returns to block 702. Otherwise, the process ends. The determination by the example model/parameter interpreter circuitry 516 may be based on whether PNT determinations were successful and/or whether additional PNT determinations are necessitated, for example.

Figure 8:
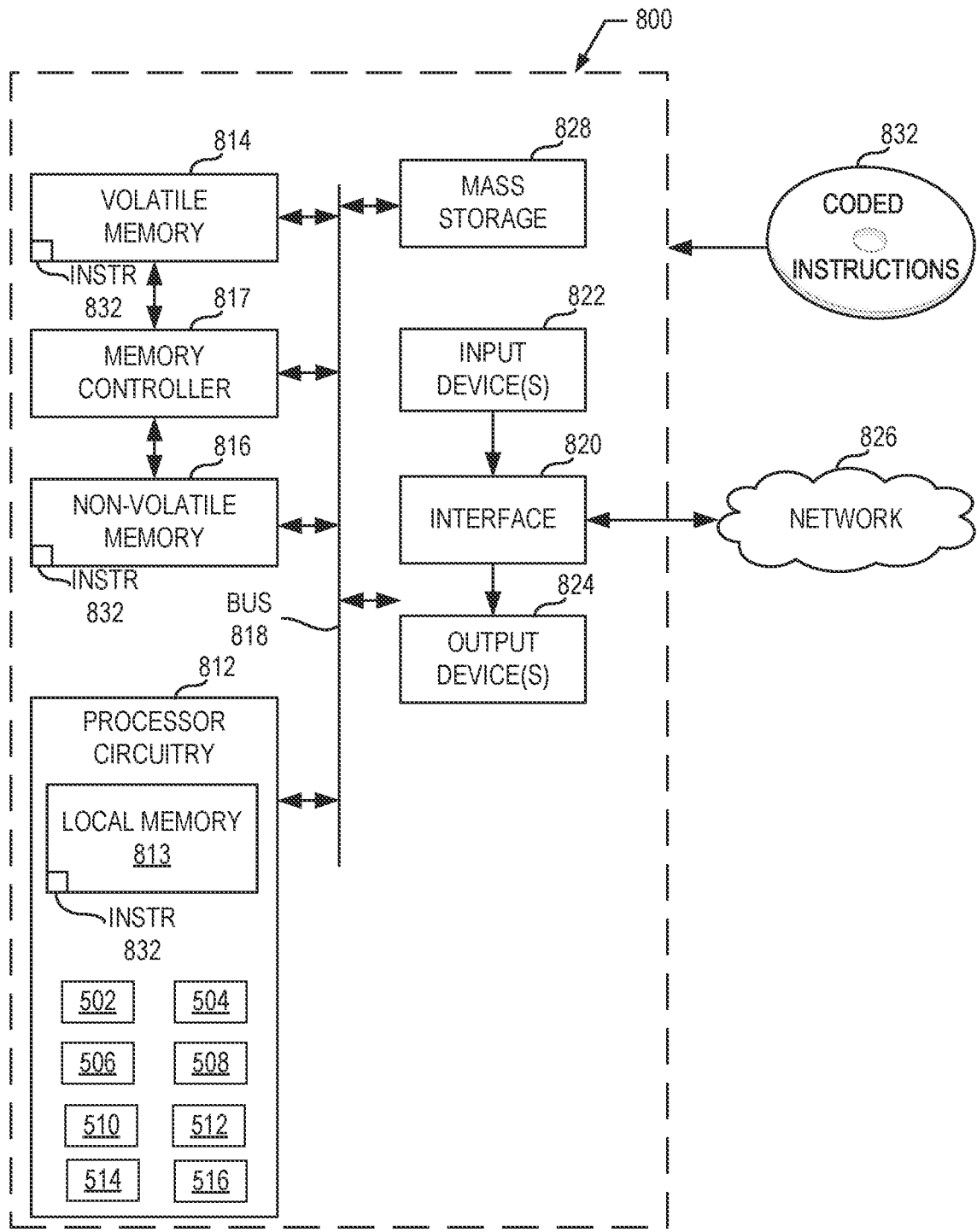
FIG. 8 is a block diagram of an example processing platform including processor circuitry structured to execute the example machine readable instructions and/or the example operations of FIGS. 6 and 7 to implement the example signal analysis system of FIG. 5.

FIG. 8 is a block diagram of an example processor platform 800 structured to execute and/or instantiate the machine readable instructions and/or the operations of FIGS. 6 and 7 to implement the signal analysis system 500 of FIG. 5. The processor platform 800 can be, for example, a server, a personal computer, a workstation, a self-learning machine (e.g., a neural network, etc.), a mobile device (e.g., a cell phone, a smart phone, a tablet, etc.), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs, microprocessors, CPUs, GPUs, DSPs, and/or microcontrollers from any desired family or manufacturer. The processor circuitry 812 may be implemented by one or more semiconductor-based (e.g., silicon-based, etc.) devices. In this example, the processor circuitry 812 implements signal recording circuitry 502, the example signal feature identifier circuitry 504, the example signal modeling circuitry 506, the example parameter generation circuitry 508, the example communication controller circuitry 510, the example machine learning model trainer circuitry 512, the example machine learning model executor circuitry 514, and the example model/parameter interpreter circuitry 516.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind, etc.) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 832, which may be implemented by the machine readable instructions of FIGS. 6 and 7, may be stored in the mass storage device 828, in the volatile memory 814, in the non-volatile memory 816, and/or on a removable non-transitory computer readable storage medium such as a CD or DVD.

Figure 9:
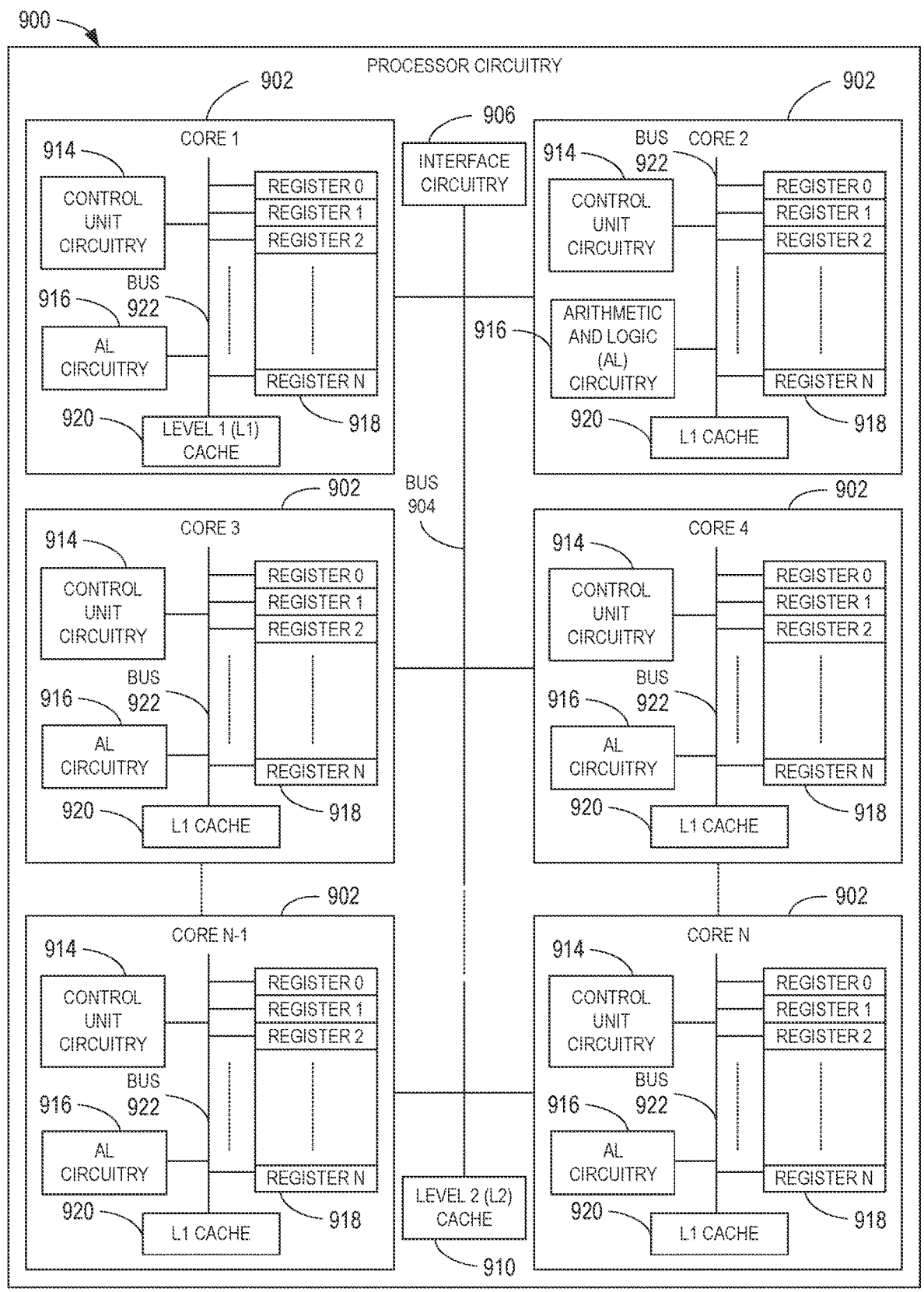
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a microprocessor 900. For example, the microprocessor 900 may be a general purpose microprocessor (e.g., general purpose microprocessor circuitry, etc.). The microprocessor 900 executes some or all of the machine readable instructions of the flowcharts of FIGS. 6 and 7 to effectively instantiate the circuitry of FIG. 5 as logic circuits to perform the operations corresponding to those machine readable instructions. In some such examples, the circuitry of FIG. 5 is instantiated by the hardware circuits of the microprocessor 900 in combination with the instructions. For example, the microprocessor 900 may be implemented by multi-core hardware circuitry such as a CPU, a DSP, a GPU, an XPU, etc. Although it may include any number of example cores 902 (e.g., 1 core, etc.), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 6 and 7.

The cores 902 may communicate by a first example bus 904. In some examples, the first bus 904 may be implemented by a communication bus to effectuate communication associated with one(s) of the cores 902. For example, the first bus 904 may be implemented by at least one of an Inter-Integrated Circuit (I2C) bus, a Serial Peripheral Interface (SPI) bus, a PCI bus, or a PCIe bus. Additionally or alternatively, the first bus 904 may be implemented by any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache, etc.), the microprocessor 900 also includes example shared memory 910 that may be shared by the cores (e.g., Level 2 (L2 cache), etc.) for high-speed access to data and/or instructions. Data and/or instructions may be transferred (e.g., shared, etc.) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8, etc.). Typically, higher levels of memory in the hierarchy exhibit lower access time and have smaller storage capacity than lower levels of memory. Changes in the various levels of the cache hierarchy are managed (e.g., coordinated, etc.) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the local memory 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate, etc.) data movement within the corresponding core 902. The AL circuitry 916 includes semiconductor-based circuits structured to perform one or more mathematic and/or logic operations on the data within the corresponding core 902. The AL circuitry 916 of some examples performs integer-based operations. In other examples, the AL circuitry 916 also performs floating point operations. In yet other examples, the AL circuitry 916 may include first AL circuitry that performs integer-based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The second bus 922 may be implemented by at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s), etc.) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
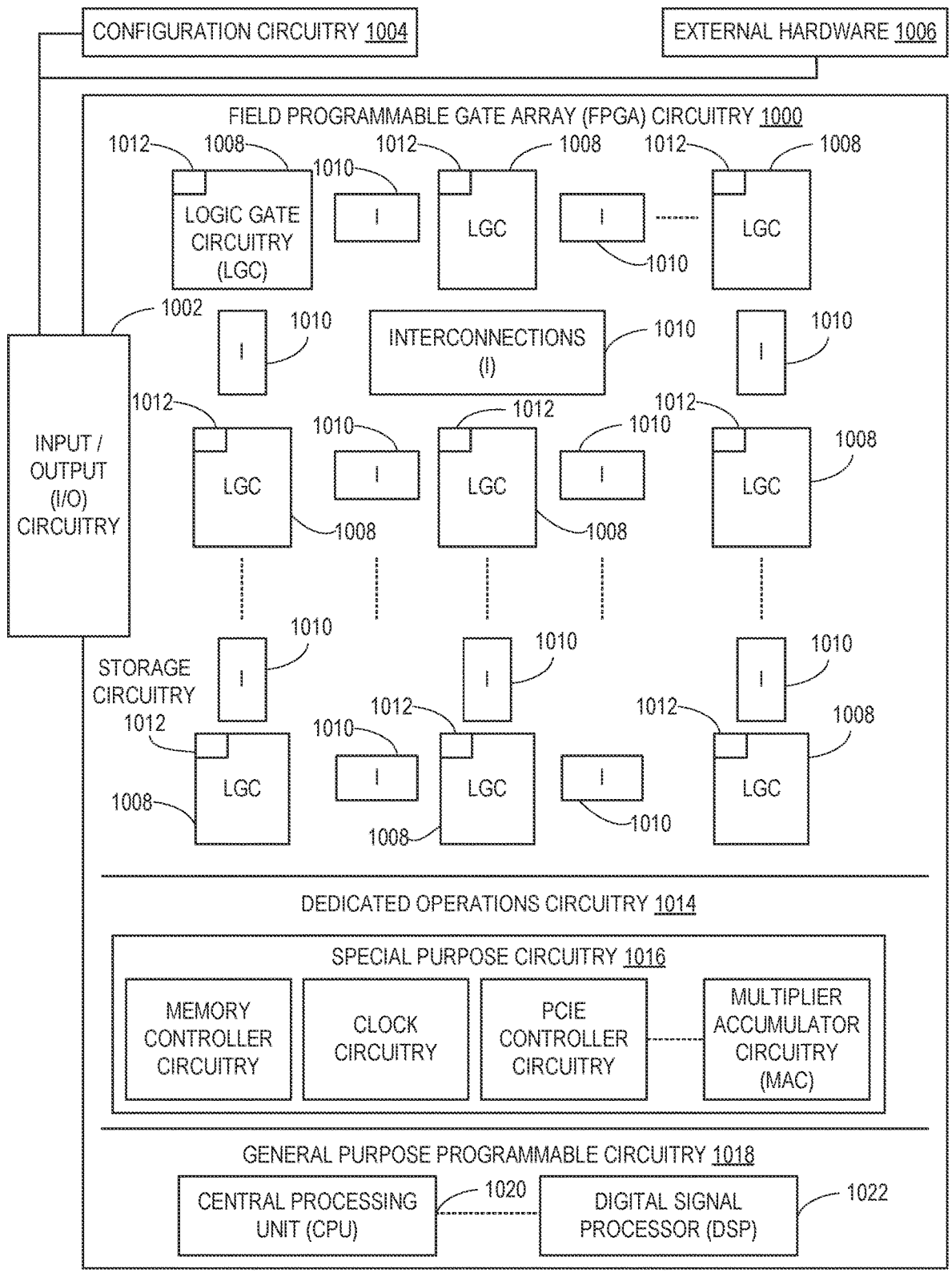
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. For example, the FPGA circuitry 1000 may be implemented by an FPGA. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 6 and 7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowchart of FIGS. 6 and 7. In particular, the FPGA circuitry 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 6 and 7. As such, the FPGA circuitry 1000 may be structured to effectively instantiate some or all of the machine readable instructions of the flowcharts of FIGS. 6 and 7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 6 and 7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware 1006. For example, the configuration circuitry 1004 may be implemented by interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions, etc.). In some examples, the external hardware 1006 may be implemented by external hardware circuitry. For example, the external hardware 1006 may be implemented by the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and the configurable interconnections 1010 are configurable to instantiate one or more operations that may correspond to at least some of the machine readable instructions of FIGS. 6 and 7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors, etc.) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches, etc.), multiplexers, etc.

The configurable interconnections 1010 of the illustrated example are conductive pathways, traces, vias, or the like that may include electrically controllable switches (e.g., transistors, etc.) whose state can be changed by programming (e.g., using an HDL instruction language, etc.) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM, etc.) controller circuitry, PCIE controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an on-board CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 6 and 7 may be executed by one or more of the cores 902 of FIG. 9, a second portion of the machine readable instructions represented by the flowcharts of FIGS. 6 and 7 may be executed by the FPGA circuitry 1000 of FIG. 10, and/or a third portion of the machine readable instructions represented by the flowchart of FIGS. 6 and 7 may be executed by an ASIC. It should be understood that some or all of the circuitry of FIG. 5 may, thus, be instantiated at the same or different times. Some or all of the circuitry may be instantiated, for example, in one or more threads executing concurrently and/or in series. Moreover, in some examples, some or all of the circuitry of FIG. 5 may be implemented within one or more virtual machines and/or containers executing on the microprocessor.

In some examples, the processor circuitry 812 of FIG. 8 may be in one or more packages. For example, the microprocessor 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
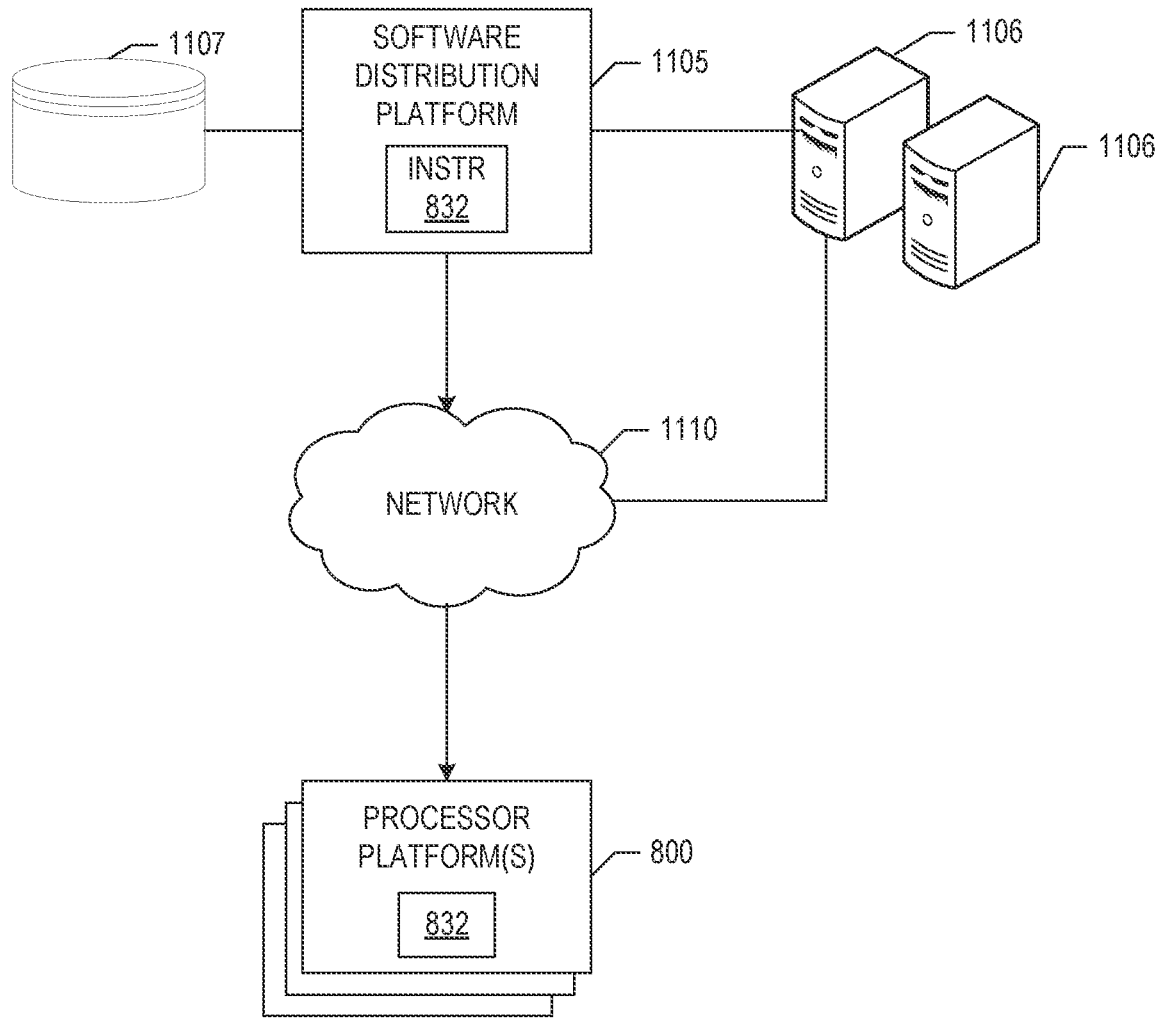
FIG. 11 is a block diagram of an example software distribution platform (e.g., one or more servers, etc.) to distribute software (e.g., software corresponding to the example machine readable instructions of FIGS. 6 and 7) to client devices associated with end users and/or consumers (e.g., for license, sale, and/or use, etc.), retailers (e.g., for sale, re-sale, license, and/or sub-license), and/or original equipment manufacturers (OEMs) (e.g., for inclusion in products to be distributed to, for example, retailers and/or to other end users such as direct buy customers, etc.).

A block diagram illustrating an example software distribution platform 1105 to distribute software such as the example machine readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers 1106 and one or more storage devices 1107. The storage devices 1107 store the machine readable instructions 832, which may correspond to the example machine readable instructions 600, 700 of FIGS. 6 and 7, as described above. The one or more servers 1106 of the example software distribution platform 1105 are in communication with an example network 1110, which may correspond to any one or more of the Internet and/or any example network. In some examples, the one or more servers 1106 are responsive to requests to transmit the software to a requesting party as part of a commercial transaction. Payment for the delivery, sale, and/or license of the software may be handled by the one or more servers 1106 of the software distribution platform and/or by a third party payment entity. The servers 1106 enable purchasers and/or licensors to download the machine readable instructions 832 from the software distribution platform 1105. For example, the software, which may correspond to the example machine readable instructions 600, 700 of FIGS. 6 and 7, may be downloaded to the example processor platform 800, which is to execute the machine readable instructions 832 to implement the signal analysis system 500. In some examples, one or more servers 1106 of the software distribution platform 1105 periodically offer, transmit, and/or force updates to the software (e.g., the example machine readable instructions 832 of FIG. 8, etc.) to ensure improvements, patches, updates, etc., are distributed and applied to the software at the end user devices.

Examples disclosed herein can advantageously enable PNT determinations in mobile stations without necessitating known relatively high bandwidth, real-time communications between a reference station and a mobile station that is performing SOOP PNT determinations when GPS and/or a global navigation satellite system (GNSS) signals are not available or are jammed. Accordingly, examples disclosed herein can enable the mobile station to be deployed with SOOP PNT operational capability without necessitating continuous communication links to the reference station, as seen in known implementations. In particular, examples disclosed herein utilize a reference station, system and/or device to analyze the SOOP and generate a model of the SOOP. As a result, the model can be utilized to generate parameters of the SOOP. The model can correspond to timing and frequency of the SOOP based on characteristics of the SOOP measured and/or observed at a mobile station (e.g., a mobile station at a remote location that is unable to acquire GPS/GNSS signals, etc.). In turn, the parameters associated with the model and/or the model are provided (e.g., transmitted, etc.) by the reference station to the mobile station, thereby enabling the mobile station to have PNT functionality without necessitating relatively high bandwidth communications between the reference station and the mobile station. Accordingly, examples disclosed herein can also provide a reliable and quickly acquired navigation source signal/reference when GPS/GPNSS signals are unavailable and/or jammed.

In some examples, the model is developed and/or generated based on mathematical modeling of the SOOP (e.g., fitting and/or estimating SOOP output characteristics with mathematical functions, such as polynomial functions, etc.). Additionally or alternatively, the model is developed and/or generated based on machine learning (ML)/artificial intelligence (AI). In some such examples, the model is trained with training data including SOOP characteristics (e.g., SOOP graphs/charts, waveforms, etc.) in conjunction with corresponding known parameters of the SOOP. The parameters of the SOOP can correspond to frequency, timing, bandwidth, signal strength, timed shifts, timing reference information, epoch and drift, SOOP transmitter location/position, satellite two-line elements, latitude, longitude, and/or altitude, a satellite ephemeris, etc. However, any other appropriate training data and/or parameters can be utilized to develop the model instead.

In some examples, parameters associated with the model are transmitted and/or uploaded to a mobile station prior to deploying or launching the mobile station. In some examples, the model is not generated unless the SOOP has a threshold degree of stability and/or predictability (e.g., for modeling, etc.). In some examples, the model is updated when the SOOP has changed to a degree that exceeds a threshold degree of change.

Example methods, apparatus, systems, and articles of manufacture to enable mobile stations to quickly track and/utilize SOOP are disclosed herein. Further examples and combinations thereof include the following:

Example 1 includes an apparatus to enable positioning, navigation and timing (PNT) determination for a mobile station with signals of opportunity (SOOP), the apparatus comprising at least one memory, machine readable instructions, and processor circuitry to at least one of instantiate or execute the machine readable instructions to identify features of the SOOP measured at a reference station, generate a model based on the identified features of the SOOP in conjunction with a position and a timing of the reference station, and provide at least one of the model or parameters associated with the model to the mobile station for the PNT determination.

Example 2 includes the apparatus as defined in example 1, further including a transmitter, wherein the processor circuitry is to at least one of instantiate or execute the instructions to cause the transmitter to transmit the at least one of the model or the parameters to the mobile station.

Example 3 includes the apparatus as defined in example 2, wherein the processor circuitry is to at least one of instantiate or execute the instructions to determine that at least one of the features of the SOOP has changed to a degree that meets or exceeds a threshold degree of change, and in response to determining that the at least one of the features has changed to the degree that meets or exceeds the threshold degree of change, update the model, and cause the transmitter to transmit at least one of the updated model or an updated parameter associated with the updated model to the mobile station.

Example 4 includes the apparatus as defined in any of examples 1 to 3, wherein the model includes a machine learning model, and wherein the processor circuitry is to at least one of instantiate or execute the machine-readable instructions to train the machine learning model with known signals and corresponding parameters of the known signals as inputs.

Example 5 includes the apparatus as defined in any of examples 1 to 4, wherein the model generated by the processor circuitry corresponds to an ephemeris and an almanac associated with a satellite that transmits the SOOP.

Example 6 includes the apparatus as defined in any of examples 1 to 5, wherein the model generated by the processor circuitry includes a function that predicts at least one characteristic of the SOOP based on time.

Example 7 includes the apparatus as defined in any of examples 1 to 6, wherein the mobile station corresponds to a personal computing device, and wherein the mobile station is to utilize the SOOP for the PNT determination in response to determining that at least one of global positioning system (GPS) signals or global navigation satellite system (GNSS) signals is unavailable to the mobile computing device.

Example 8 includes the apparatus as defined in any of examples 1 to 7, wherein the parameters are to be provided to the mobile station, and wherein the parameters include a timing and a frequency of the SOOP.

Example 9 includes a non-transitory machine readable storage medium comprising instructions that, when executed, cause processor circuitry to at least identify features of signals of opportunity (SOOP) measured at a reference station, generate a model based on the identified features of the SOOP in conjunction with a position and a timing of the reference station, and provide at least one of the model or parameters associated with the model to a mobile station for a positioning, navigation and timing (PNT) determination corresponding to the mobile station.

Example 10 includes the non-transitory machine readable storage medium as defined in example 9, wherein the instructions cause the processor circuitry to cause a transmitter of the reference station to transmit the at least one of the model or the parameters to the mobile station.

Example 11 includes the non-transitory machine readable storage medium as defined in example 10, wherein the instructions cause the processor circuitry to determine that at least one of the features of the SOOP has changed to a degree that meets or exceeds a threshold degree of change, and in response to determining that the at least one of the features has changed to the degree that meets or exceeds the threshold degree of change, update the model, and cause a transmitter to transmit at least one of the updated model or an updated parameter associated with the updated model to the mobile station.

Example 12 includes the non-transitory machine readable storage medium as defined in any of examples 9 to 11, wherein the model includes a machine learning model, and wherein the instructions cause the processor circuitry to train the machine learning model with known signals and corresponding parameters of the known signals as inputs.

Example 13 includes the non-transitory machine readable storage medium as defined in example 12, wherein the instructions cause the processor circuitry to cause a transmitter to transmit the machine learning model to the mobile station such that the machine learning model is executed in an inference phase at the mobile station.

Example 14 includes the non-transitory machine readable storage medium as defined in any of examples 9 to 12, wherein the instructions cause the processor circuitry to determine that the SOOP has a threshold degree of stability to be modelled, in response to determining that the SOOP has the threshold degree of stability, enable the model to be generated, and in response to determining that the SOOP does not have the threshold degree of stability, prevent the model from being generated.

Example 15 includes a method comprising identifying, by executing instructions with processor circuitry, features of signals of opportunity (SOOP) measured at a reference station, generating, by executing instructions with the processor circuitry, a model based on the identified features of the SOOP in conjunction with a position and a timing of the reference station, and transmitting, via a transmitter, at least one of the model or parameters associated with the model to a mobile station for a positioning, navigation and timing (PNT) determination corresponding to the mobile station.

Example 16 includes the method as defined in example 15, further including determining, by executing instructions with the processor circuitry, that at least one of the features of the SOOP has changed to a degree that meets or exceeds a threshold degree of change, and in response to determining that the at least one of the features has changed to the degree that meets or exceeds the threshold degree of change, updating, by executing instructions with the processor circuitry, the model, and causing a transmitter to transmit at least one of the updated model or an updated parameter associated with the updated model to the mobile station.

Example 17 includes the method as defined in any examples 15 or 16, wherein the model is generated by training a machine learning model with known signals and corresponding parameters of the known signals as inputs.

Example 18 includes the method as defined in example 17, wherein the model is transmitted to the mobile station by transmitting the machine learning model to the mobile station such that the machine learning model is executed in an inference phase at the mobile station.

Example 19 includes the method as defined in any of examples 15 to 18, wherein the model is generated by generating a time-based function that predicts at least one characteristic of the SOOP.

Example 20 includes the method as defined in any of examples 15 to 19, further including determining, by executing instructions with the processor circuitry, that the SOOP has a threshold degree of stability to be modelled, in response to determining that the SOOP has the threshold degree of stability, enabling, by executing instructions with the processor circuitry, the model to be generated, and in response to determining that the SOOP does not have the threshold degree of stability, preventing, by executing instructions with the processor circuitry, the model from being generated.

From the foregoing, it will be appreciated that example systems, methods, apparatus, and articles of manufacture have been disclosed that enable relatively quick PNT determinations without necessitating high-bandwidth connections and computations associated with known systems. Disclosed systems, methods, apparatus, and articles of manufacture improve the efficiency of using a computing device by reducing and/or eliminating relatively constant communication between reference stations and mobile stations, thereby eliminating the real-time comparison analyses of signals performed to synchronize the mobile stations. As a result, examples disclosed herein can significantly reduce computational needs and/or management of network communications. Disclosed systems, methods, apparatus, and articles of manufacture are accordingly directed to one or more improvement(s) in the operation of a machine such as a computer or other electronic and/or mechanical device.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to enable positioning, navigation and timing (PNT) determination for a mobile station with signals of opportunity (SOOP), the apparatus comprising:
    machine readable instructions; and programmable circuitry to execute the machine readable instructions to:
    identify features of the SOOP measured at a reference station,
    generate a model based on the identified features of the SOOP in conjunction with a position and a timing of the reference station,
    provide at least one of the model or parameters associated with the model to the mobile station for the PNT determination:
    compare a degree of change of at least one of the identified features of the SOOP to a threshold degree of change to determine that the degree of change of the least one of the identified features has met or exceeded the threshold degree of change; and in response to determining that the degree of change of the at least one of the identified features meets or exceeds the threshold degree of change,
    update the model,
    repeat updating the model until the degree of change of the least one of the identified features no longer exceeds the threshold degree of change; and
    cause a transmitter to transmit at least one of the updated model or an updated parameter associated with the updated model to the mobile station, wherein the mobile station is to switch to the SOOP from the updated model when at least one of global positioning system (GPS) signals or global navigation satellite system (GNSS) signals is unavailable to the mobile station.

2. The apparatus as defined in claim 1, wherein the model generated by the programmable circuitry corresponds to an ephemeris and an almanac associated with a satellite that transmits the SOOP.

3. The apparatus as defined in claim 1, wherein the model generated by the programmable circuitry includes a function that predicts a waveform shape of the SOOP based on time.

4. The apparatus as defined in claim 1, wherein the mobile station corresponds to a personal computing device.

5. The apparatus as defined in claim 1, wherein the programmable circuitry is to record a time history of the SOOP for generation of the model.

6. An apparatus to enable positioning, navigation and timing (PNT) determination for a mobile station with signals of opportunity (SOOP), the apparatus comprising:
    machine readable instructions; and
    programmable circuitry to execute the machine readable instructions to:
    identify features of the SOOP measured at a reference station,
    generate a model based on the identified features of the SOOP in conjunction with a position and a timing of the reference station, wherein the model includes a machine learning model, and wherein the programmable circuitry is to train the machine learning model with a signal history of the SOOP and corresponding parameters of the signal history as inputs;
    update the model,
    repeat updating the model until the degree of change of the least one of the identified features no longer exceeds the threshold degree of change; and
    cause a transmitter to transmit at least one of the updated model or an updated parameter associated with the updated model to the mobile station, wherein the mobile station is to switch to the SOOP from the updated model when at least one of global positioning system (GPS) signals or global navigation satellite system (GNSS) signals is unavailable to the mobile station.

7. The apparatus as defined in claim 6, wherein the machine learning model is trained with at least one of a timing or a frequency of the SOOP.

8. An apparatus to enable positioning, navigation and timing (PNT) determination for a mobile station with signals of opportunity (SOOP), the apparatus comprising:
    at least one memory;
    machine readable instructions; and programmable circuitry to execute the machine readable instructions to:
    identify features of the SOOP measured at a reference station,
    generate a model based on the identified features of the SOOP in conjunction with a position and a timing of the reference station, and provide parameters associated with the model to the mobile station for the PNT determination, wherein the parameters include a timing and a frequency of the SOOP,
    update the model,
    repeat updating the model until the degree of change of the least one of the identified features no longer exceeds the threshold degree of change; and
    cause a transmitter to transmit at least one of the updated model or an updated parameter associated with the updated model to the mobile station, wherein the mobile station is to switch to the SOOP from the updated model when at least one of global positioning system (GPS) signals or global navigation satellite system (GNSS) signals is unavailable to the mobile station.

9. A non-transitory machine readable storage medium comprising instructions that cause at least one programmable circuitry to at least:
    identify features of signals of opportunity (SOOP) measured at a reference station;
    generate a model based on the identified features of the SOOP in conjunction with a position and a timing of the reference station;

provide at least one of the model or parameters associated with the model to a mobile station for a positioning, navigation and timing (PNT) determination corresponding to the mobile station;

determine that at least one of the identified features of the SOOP has changed to a degree that meets or exceeds a threshold degree of change; and in response to determining that the at least one of the identified features has changed to the degree that meets or exceeds the threshold degree of change, update the model, repeat updating the model until the degree of change of the least one of the identified features no longer exceeds the threshold degree of change; and cause a transmitter to transmit at least one of the updated model or an updated parameter associated with the updated model to the mobile station, wherein the mobile station is to switch to the SOOP from the updated model when at least one of global positioning system (GPS) signals or global navigation satellite system (GNSS) signals is unavailable to the mobile station.

10. The non-transitory machine readable storage medium as defined in claim 9, wherein the instructions cause one or more of the at least one programmable circuitry to:

determine that the SOOP has a threshold degree of stability to be modelled;

in response to determining that the SOOP has the threshold degree of stability, enable the model to be generated; and in response to determining that the SOOP does not have the threshold degree of stability, prevent the model from being generated.

11. A non-transitory machine readable storage medium comprising instructions that cause at least one programmable circuitry to at least:

identify features of signals of opportunity (SOOP) measured at a reference station;

generate a model based on the identified features of the SOOP in conjunction with a position and a timing of the reference station, wherein the model includes a machine learning model;

provide at least one of the model or parameters associated with the model to a mobile station for a positioning, navigation and timing (PNT) determination corresponding to the mobile station; and cause one or more of the at least one programmable circuitry to train the machine learning model with a signal history of the SOOP and corresponding parameters of the signal history as inputs, repeat updating the model until the degree of change of the least one of the identified features no longer exceeds the threshold degree of change; and cause a transmitter to transmit at least one of the updated model or an updated parameter associated with the updated model to the mobile station, wherein the mobile station is to switch to the SOOP from the updated model when at least one of global positioning system (GPS) signals or global navigation satellite system (GNSS) signals is unavailable to the mobile station.

12. The non-transitory machine readable storage medium as defined in claim 11, wherein the instructions cause one or more of the at least one programmable circuitry to cause the transmitter to transmit the machine learning model to the mobile station such that the machine learning model is executed in an inference phase at the mobile station.

13. A method comprising:

identifying, by executing instructions with at least one programmable circuitry features of signals of opportunity (SOOP) measured at a reference station;

generating, by executing instructions with one or more of the at least one programmable circuitry, a model based on the identified features of the SOOP in conjunction with a position and a timing of the reference station; and causing transmission, via a transmitter, of at least one of the model or parameters associated with the model to a mobile station for a positioning, navigation and timing (PNT) determination corresponding to the mobile station determining, by executing instructions with one or more of the at least one programmable circuitry, that at least one of the identified features of the SOOP has changed to a degree that meets or exceeds a threshold degree of change; and in response to determining that the at least one of the identified features has changed to the degree that meets or exceeds the threshold degree of change, updating, by executing instructions with one or more of the at least one programmable circuitry, the model, repeat updating the model until the degree of change of the least one of the identified features no longer exceeds the threshold degree of change; and causing a transmitter to transmit at least one of the updated model or an updated parameter associated with the updated model to the mobile station, wherein the mobile station is to switch to the SOOP from the updated model when at least one of global positioning system (GPS) signals or global navigation satellite system (GNSS) signals is unavailable to the mobile station.

14. The method as defined in claim 13, wherein the model is generated by generating a time-based function that predicts a waveform shape of the SOOP.

15. The method as defined in claim 13, further including:

determining, by executing instructions with one or more of the at least one programmable circuitry, that the SOOP has a threshold degree of stability to be modelled;

in response to determining that the SOOP has the threshold degree of stability, enabling, by executing instructions with one or more of the at least one programmable circuitry, the model to be generated; and in response to determining that the SOOP does not have the threshold degree of stability, preventing, by executing instructions with one or more of the at least one programmable circuitry, the model from being generated.

16. A method comprising:

identifying, by executing instructions with at least one programmable circuitry, features of signals of opportunity (SOOP) measured at a reference station;

generating, by executing instructions with one or more of the at least one programmable circuitry, a model based on the identified features of the SOOP in conjunction with a position and a timing of the reference station, wherein the model is generated by training a machine learning model with a signal history of the SOOP and corresponding parameters of the signal history as inputs;

updating the model, repeating updating the model until the degree of change of the least one of the identified features no longer exceeds the threshold degree of change; and causing a transmitter to transmit at least one of the updated model or an updated parameter associated with the updated model to the mobile station, wherein the mobile station is to switch to the SOOP from the updated model when at least one of global positioning system (GPS) signals or global navigation satellite system (GNSS) signals is unavailable to the mobile station.

17. The method as defined in claim 16, wherein the model is transmitted to the mobile station by transmitting the machine learning model to the mobile station such that the machine learning model is executed in an inference phase at the mobile station.

* * * * *